United States Patent
Sheik-Bahae

[19]

[11] Patent Number: 6,108,085
[45] Date of Patent: Aug. 22, 2000

[54] INTERFEROMETRIC AUTO-CORRELATOR USING THIRD-ORDER NONLINEARITY

[75] Inventor: Mansoor Sheik-Bahae, Albuquerque, N. Mex.

[73] Assignee: University of New Mexico, Albuquerque, N. Mex.

[21] Appl. No.: 08/752,068

[22] Filed: Nov. 19, 1996

Related U.S. Application Data

[60] Provisional application No. 60/007,447, Nov. 22, 1995.

[51] Int. Cl.[7] ....................................................... G01B 9/02
[52] U.S. Cl. ........................... 356/345; 356/351; 356/349
[58] Field of Search ..................................... 356/345, 351, 356/349

[56] References Cited

U.S. PATENT DOCUMENTS

| | | | |
|---|---|---|---|
| 4,792,230 | 12/1988 | Naganuma et al. | 356/345 |
| 5,033,853 | 7/1991 | Frangineas | 356/346 |
| 5,068,525 | 11/1991 | Schaefer et al. | 250/213 |
| 5,299,170 | 3/1994 | Shibata et al. | 356/351 |
| 5,403,520 | 4/1995 | Ashitaka et al. | 252/582 |

OTHER PUBLICATIONS

A. Brun et al., "Single–shot characterization of ultrashort light pulses," 24 J. Phys. D: Appl. Physl, pp. 1225–1253 Jan. 1991.

J.L.A. Chilla, "Direct determination of the amplitude and the phase of femtosecond light pulses," 16 Optics Letters, No. 1, pp. 39–412 Jan. 1991.

R. Trebino et al., "Chirp and self–phase modulation in induced–grating autocorrelation measurements of ultrashort pulses," 15 Optics Letters, No. 19, pp. 1079–1081 (Oct. 1990).

R. Trebino et al., "Fourth–order partial–coherence effects in the formation of integrated–intensity gratings with pulsed light sources," 3 J. Opt. Soc. Am. B, No. 10, pp. 1295–1304 (Oct. 1986).

J. M. Diels et al., "Control and measurement of ultrashort pulse shapes (in amplitude and phase) with femtosecond accuracy," 24 Applied Optics, No. 9, pp. 1270–1282 (May 1985).

*Primary Examiner*—Robert H. Kim
*Attorney, Agent, or Firm*—Jeffrey D. Myers; Nancy E. Ownbey

[57] ABSTRACT

Interferometric auto-correlation is obtained using third-order ($\chi^{(3)}$) nonlinearities. The nonlinear signal is separated from the linear interferometric response in order to extract information about the amplitude and the chirp of the ultrashort pulses. In one technique, cross-polarized beams are provided to eliminate the linear response. In another technique, electronic filtering is used. Electronic filtering provides substantial reduction of cost, size and complexity over conventional second harmonic generator crystals.

12 Claims, 4 Drawing Sheets

INTERFEROMETRIC AUTO-CORRELATOR USING THIRD-ORDER NONLINEARITY

This application claims the priority date of U.S. provisional application Ser. No. 60/007,447, filed Nov. 22, 1995.

BACKGROUND OF THE INVENTION

This invention relates to interferometric auto-correlation and, more particularly, to interferometric auto-correlation using third-order nonlinearities.

Interferometric auto-correlation (IAC) measurements are used frequently to determine the pulse-width as well as the frequency chirp on ultrashort pulses (e.g. between 1 ps to 10 fs) from continuous-wave (cw) modelocked lasers. This type of measurement conventionally uses second-harmonic generation (SHG) in a Michelson interferometer. In the Michelson interferometer, an incoming train of pulses is split into two beams that are directed along two arms of the interferometer. Upon retro-reflection from mirrors or corner-cubes that introduce a variable delay in one of the beams, the two beams are recombined co-linearly at the beam splitter. Thus, the optical field exiting the interferometer (combined beams) is written as:

$$E = E_1 + E_2 = E_0(t) \cos(\omega t + \phi(t)) + \alpha E_0(t+\tau) \cos(\omega t + \omega \tau + \phi(t+\tau)) \quad \text{Eqn. (1)}$$

where $E_0$ is the amplitude function of the pulse, $\omega$ is the frequency, $\phi$ is the phase (including the chirp) of the pulse, $\tau$ is the delay, and $\alpha$ is the ratio of the two field amplitudes.

The field represented by Eqn. (1), when focused into a second-harmonic (SHG) crystal, produces light at a frequency $2\omega$, whose irradiance (in the low conversion limit) is proportional to the square of the incident irradiance:

$$I_{2\omega} I_\omega^2 = |E|^4$$

Since the detector measures a time average (over $\cong$100 ns time scale) the measured quantity is: $S_{nl}(\tau) = \int I_{2\omega} dt$. Normalizing this quantity and using the normalized irradiance envelope function $f(t) E_0^2(t)$, $S_{nl}(\tau)$ becomes $$S_{nl}(\tau) = 1 + 2 \int f(t) f(t+\tau) dt + \quad \text{Eqn. (2)}$$
$$\int f(t) f(t+\tau) \cos(2\omega\tau + 2\Delta\phi) dt +$$
$$2a \int f^{1/2}(t) f^{3/2}(t+\tau) \cos(\omega\tau + \Delta\phi) dt +$$
$$2/a \int f^{3/2}(t) f^{1/2}(t+\tau) \cos(\omega\tau + \Delta\phi) dt$$

which is normalized to $a^2 \int f^2(t) dt = 1$, and where $\Delta\phi(t,\tau) = \phi(t+\tau) - \phi(t)$. In Eqn. (2) the first integral represents the intensity auto-correlation, while the remaining integrals are interferometric terms containing information about the phase, i.e., the chirp, of the laser pulse.

Real-time measurement of $S_{nl}(\tau)$ is obtained by mounting the retro-reflector of the delay arm on a speaker, which is driven by a low frequency (20–50 Hz) sinusoidal voltage. Then, the displacement of the reflector due to vibration of the speaker is $x = x_0 \sin(\Omega t)$, leading to a variable round-trip delay of $\tau = 2(x_0/c) \sin(\Omega t) \cong 2x_0 \Omega t/c$. The $\omega\tau$ terms in Eqn. (2) can be written in real time as $\omega' t$, where $\omega' \cong 2x_0\Omega\omega/c = 2(v/c)\omega$ and $v$ is the velocity of the speaker vibration at its zero crossing. This configuration allows IAC traces of cw modelocked laser pulse trains to be viewed directly on an oscilloscope. By adjusting $\Omega$ and $x_0$ (i.e., the voltage swing on a speaker driver) $\omega'$ is controlled. Typical values are between 0.5 to 2 MHz. Note that, to observe fringes, the detection system has to be fast compared to the period of the oscillations (2 to 0.5 $\mu$s.

The SHG method has a large signal-to-noise ratio since there is no linear background present. But it requires a phase-matchable second order nonlinear crystal. Furthermore, in the femtosecond regime, group velocity mismatch between $\omega$ and $2\omega$ beams imposes a limit on the thickness of the nonlinear crystal. For example, using $LiIO_3$ in order to measure 50 fs pulses, a crystal having a thickness <100 $\mu$s should be used. This restriction in thickness, in turn, limits the amount of generated $2\omega$ power, and, hence, sensitive detectors such as photo-multiplier tubes (PMT) are required. Together, the SHG crystal and the detection system are costly devices.

In accordance with the present invention, third-order nonlinearities are used to provide an auto-correlator that is wavelength agile (always phase matched) without the use of SHG crystals.

Additional objects, advantages and novel features of the invention will be set forth in part in the description which follows, and in part will become apparent to those skilled in the art upon examination of the following or may be learned by to practice of the invention. The objects and advantages of the invention may be realized and attained by means of the instrumentalities and combinations particularly pointed out herein.

SUMMARY OF THE INVENTION

To achieve the foregoing and other objects, and in accordance with the purposes of the present invention, as embodied and broadly described herein, the apparatus of this invention may comprise an autocorrelator using third-order nonlinearities for determining characteristics of a beam of femtosecond light. An interferometer outputs a light beam containing linear and nonlinear signals functionally related to the femtosecond light. An electronic device substantially eliminates the linear signal wherein the nonlinear signal provides an interferometric autocorrelation of the beam of femtosecond light pulses.

In one embodiment, the electronic device for substantially eliminating the linear signal is a polarizing means in one leg of the interferometer. In another embodiment, the electronic device for substantially eliminating the linear signal is an electronic filter to reject signal frequencies corresponding to the linear signal.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings, FIG. 1A schematically depicts a z-scan device for detecting nonlinear transmittance through an aperture.

DETAILED DESCRIPTION OF THE INVENTION

Figure 1A:
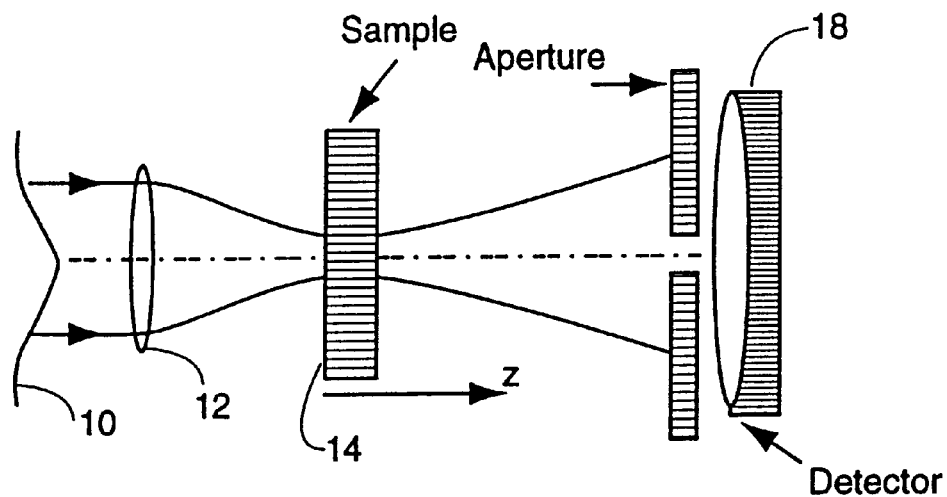
FIG. 1B graphically depicts exemplary z-scan traces for several nonlinear phase shifts.
Figure 1B:
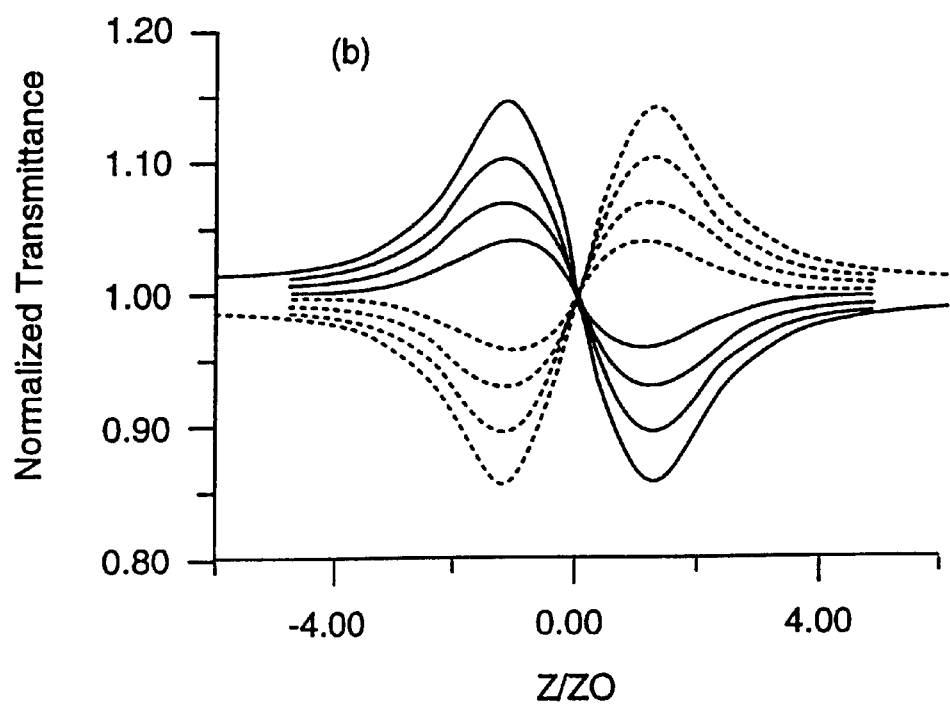

Degenerate third-order nonlinearities are described by nonlinear susceptibility $\chi^{(3)}(\omega_1\omega;-\omega_1\omega)$. The real and imaginary parts of $\chi^{(3)}$ are related to nonlinear refraction coefficient $n_2$ and two-photon absorption (TPA) coefficient $\beta$, respectively. In a nonlinear absorption and/or Kerr-lensing measurement, such as Z-scan, the transmitted irradiance can be taken to vary quadratically with incident irradiance for relatively small transmittance changes:

$$I_t(t,\tau) \approx I_i(t,\tau) - KI_i^2(t,\tau) \quad \text{Eqn. (3)}$$

where $K \approx \beta L$ for TPA and $K \approx Ak_0n_2L$ for Kerr-lensing in a Z-scan geometry, such as shown in FIG. 1A. Light pulse 10 is focused by lenses 14 through nonlinear sample material 14 and incident on aperture 16. Detector 18 detects the light transmitted by aperture 16. The position z of sample 14 is varied about the focus of light pulse 10 to produce a Z-scan trace showing peak-valley variations as a function of sample position. FIG. 1B is an exemplary Z-scan with traces calculated for peak nonlinear phase shift $\Delta\Phi_0 = \pm 0.25$, $\pm 0.50 \pm 0.75$, and $\pm 1.0$, where the dashed and solid lines correspond to negative and positive $n_2$, respectively. A 10% aperture transmittance was assumed.

The parameter A in Eqn. (3) depends on the sample position z as well as the size of the aperture used in the far-field detection of a Z-scan. For example, $A \approx \pm 2$ for a low transmittance ($\approx 2\%$) obstruction disk in an eclipsing Z-scan geometry. The sign $\pm$ depends whether the nonlinear sample is positioned at the peak (+) or valley (−) of the Z-scan. Eqn. (3) is a very good approximation as long as $KI_i < 0.1$ for TPA, and $|KI_i| \leq 0.3$ for Kerr-lensing.

The quadratic term in Eqn. (3) gives rise to a signal identical to that of Eqn. (1) if the SHG crystal is replaced by a Kerr or TPA nonlinear material. While accurate intensity auto-correlations can be easily obtained using this method, interferometric measurements for determining the pulse chirp are hindered by the presence of the linear term. The difficulty arises from the fact that the transmitted optical field is now at the driving frequency ($\omega$) rather than the second harmonic ($2\omega$). The nonlinear signal, therefore, can not be distinguished from the linear term in Eqn. (3), which also contains the linear interferometric field auto-correlation signal given by:

$$S_{lin}(\tau) = 1 + a\int \sqrt{f(t)f(t+\tau)} \cos(\omega\tau + \Delta\phi)dt. \quad \text{Eqn. (4)}$$

The total detected signal is then the sum of the linear and nonlinear contributions:

$$S(\tau) = S_{lin}(\tau) + qS_{nl}(\tau), \quad \text{Eqn. (5)}$$

where $q = KI_0$ with $I_0$ being the peak irradiance.

Figure 2:
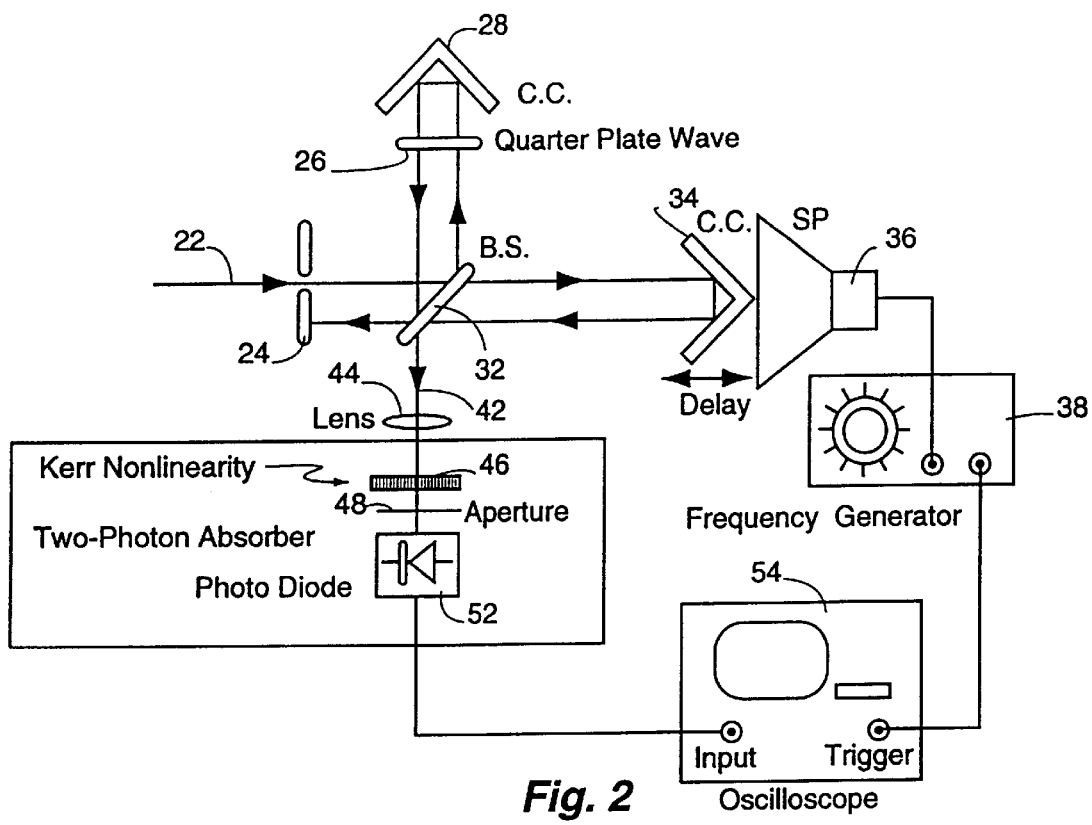
FIG. 2 is a schematic of an interferometer using polarization to substantially eliminate a linear response.

FIG. 2 schematically depicts an interferometer for greatly reducing the linear interference term. Quarter-wave plate 26 is inserted in one of the arms of the interferometer to force the polarization of a portion of beam 22 to be orthogonal to another portion of beam 22. Beam 22 is transmitted through aperture 24 to beam splitter 32 where a first portion of the beam is transmitted to corner cube 28 and returned through quarter-wave plate 26. A second portion of the beam is transmitted to corner cube 34 and returned so that the first and second beam portions are combined by beam splitter 32 to form beam 42.

Corner cube 34 is oscillated by speaker 36, driven by function generator 38. Combined beams 42 are focused by lens 46 through nonlinear medium 46 and onto aperture 48, as discussed above for a Z-scan geometry. It will be understood that quarter-wave plate 26 may be in either arm of the interferometer and that nonlinear medium 46 may be, e.g., a Kerr nonlinearity or a two-photon absorber, as contemplated by Eqn. (2). As discussed above, the output beam from nonlinear medium 46 is selected by aperture 48 for input to photo-diode detector 52. The output from detector 52 is displayed on oscilloscope 54.

Figure 3:
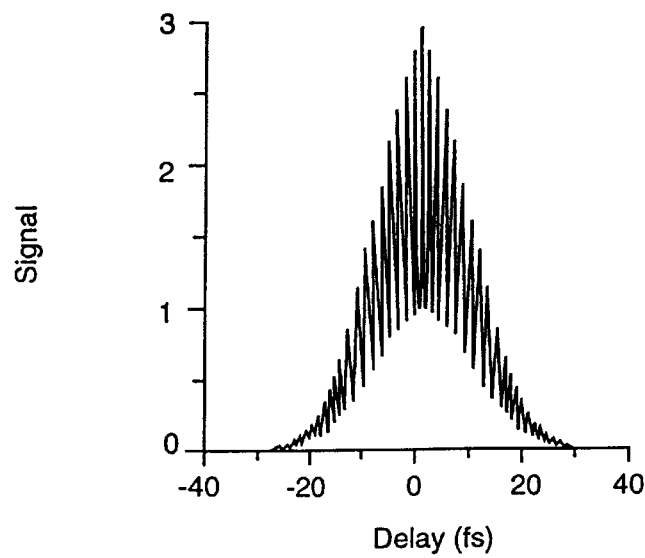
FIG. 3 graphically illustrate a third-order interferometric auto-correlation using cross-polarized beams.

By forcing the polarization of the first and second beam portions to be orthogonal, the linear interference term of Eqn. (1) is eliminated (within the extinction ratio of the wave plate). This process also affects the nonlinear term and eliminates the last two terms of $S_{nl}(\tau)$ in Eqn. (1). By changing the delay every half optical cycle, the polarization of the resultant optical field exiting the interferometer is effectively changed from linear to circular or vice versa. The nonlinear signal can be written as:

$$S_{nl}(\tau) = 1 + \eta\int f(t)f(t+\tau)dt + (1-\eta)\int f(t)f(t+\tau)\cos(2\omega\tau + 2\Delta\phi)dt \quad \text{Eqn. (6)}$$

where $\eta$ is circular/linear dichroism of the nonlinearity, which depends on the material parameters and the incident photon energy. It has been shown that, for bound electronic $n_2$ in solids, $\eta$ may vary from $\frac{2}{3}$ at long wavelengths to $\approx 1$ at near resonant condition. Similarly, for TPA, $\eta$ can vary between these values depending on the band structure of the material. FIG. 3 shows the calculated $S_{nl}(\tau)$ assuming $\eta = \frac{2}{3}$, indicating a fringe depth of about 67% ($\frac{2}{3}$) for an unchirped pulse.

The uncertainty in the value of $\eta$ adds undesirable complexity in extracting information from such interferometric measurement. Moreover, due to difficulty in obtaining pure cross-polarized beams, there is always a residual linear term than can interfere with the useful nonlinear signal. In accordance with another aspect of the present invention, a technique based on electronic filtering eliminates the linear term without introducing material dependent parameters.

As shown above, the $\omega\tau$ terms in the interferometric terms are transformed into $\omega't$, where t is the real time and $\omega' = 2\omega v/c$ is in the MHz region. Therefore, by filtering out the $\omega'$ term, the linear interferometric term is eliminated from the signal. Note that, similar to the case of cross-polarized beams, this process also eliminates the nonlinear interferometric terms occurring at $\omega'$. The advantage, however, is that, in this case, no material-dependent parameter is present. The transmitted signal is then given by:

$$S_{NL}(\tau) = I + 2\int f(t)f(t+\tau)dt + \int f(t)f(t+\tau)\cos(2\omega\tau + 2\Delta\phi)dt. \quad \text{Eqn. (6)}$$

Eqn. (6) gives an auto-correlation trace that always has a fringe depth ratio of 3-to-1.

Figure 4:
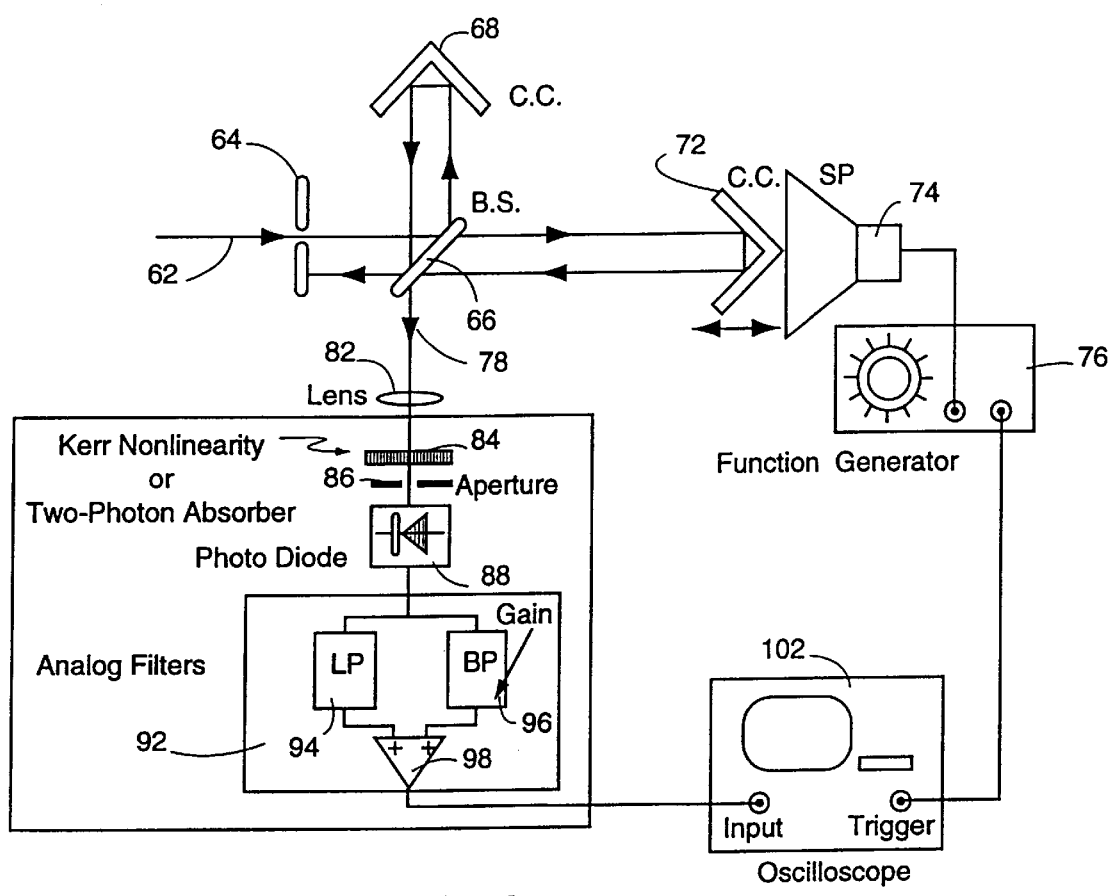
FIG. 4 is a schematic of an interferometer using electronic filters to substantially eliminate a linear response.

In a preferred embodiment, instead of a single band-reject filter, a low-pass band-pass filter combination is used to suppress the linear contribution as shown in FIG. 4. FIG. 4 depicts an interferometer for determining the pulse characteristics in femtosecond laser beam pulse 62. Beam 62 passes through aperture 64 and is split by beam splitter 66 into first and second beam portions. A first beam portion is directed through corner cube 68 to lens 82. A second beam portion is directed through corner cube 72 that is oscillated by speaker 74, that is controlled by function generator 76 and returned to lens 82. Combined beam 78 is directed through a Z-scan device, consisting of nonlinear medium 84, aperture 86, and detector 88, as discussed above. The output from detector is passed through analog filter 92, having low-pass filter 94, band-pass filter 96, and amplifier 98 and displayed on oscilloscope 102.

Analog filter 92, has the advantage of providing separate gain control for the two remaining beam components, namely the intensity auto-correlation and the interferometric term at 2ω'. Therefore, introducing a relative gain G for the band-pass filter 96 at 2ω'. (with respect to a unity gain for low-pass filter 94), the detected signal is represented by:

$$S(\tau)=I+2\int f(t)\ f(t+\tau)dt+G\int f(t)f(t\tau)\cos(2\omega\tau+2\Delta\phi)dt. \quad \text{Eqn. (7)}$$

Figure 5:
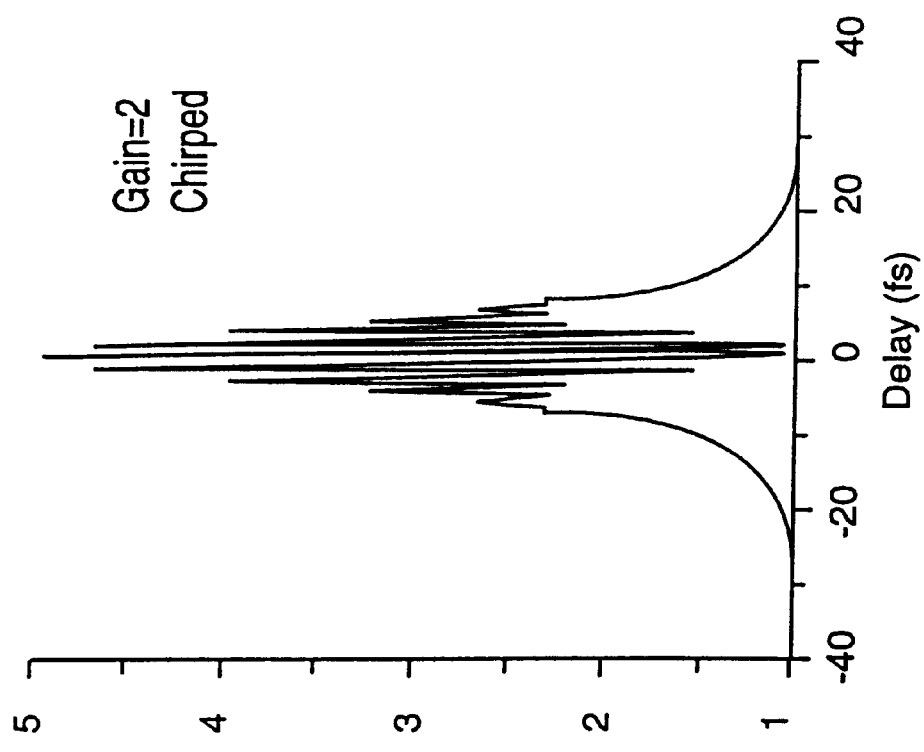
FIG. 5 graphically depicts an interferometric auto-correlation of 10 fs pulses calculated with a band-pass filter gain of 2.
Figure 5:
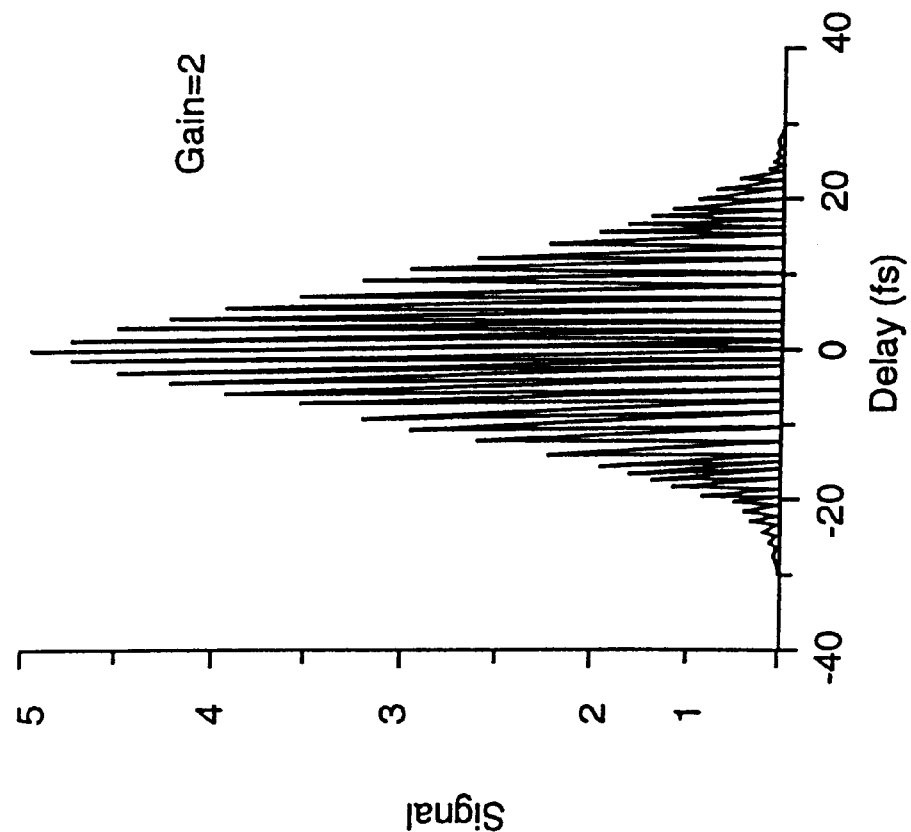

FIG. 5 shows calculated S(τ) for a G=2 system assuming (a) unchirped and (b) linearly chirped (g=0.03 fs$^{-2}$) pulses. As seen, the G-2 case is particularly interesting since an unchirped auto-correlation has a 100% fringe depth, making it easy to differentiate from a chirped signal.

It will be appreciated from the above discussion that IAC using third order nonlinearities provides several advantages over IAC using SHG crystals. IAC traces with 100% fringe depth can be generated for conveniently determining the presence of the chirp on the pulses. Further, inexpensive nonlinear materials (e.g., semiconductors such as ZnSe) with large n$_2$ or β coefficients can be used. Since transmittance changes of the incident beams are being measured, low cost diode photodiodes can be used as detectors rather than PMTs. In addition, since no phase matching is required, the system is wavelength agile, i.e., it can be used within a large range of wavelengths. Finally, there is no restriction on the 10 thickness of the nonlinear material since group-velocity mismatch is not an issue for this type of nonlinearity.

The foregoing description of the preferred embodiments of the invention have been presented for purposes of illustration and description. It is not intended to be exhaustive or to limit the invention to the precise form disclosed, is and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated.

What is claimed is:

1. An autocorrelator using third-order nonlinearities for determining characteristics of a beam of light pulses, said autocorrelator comprising:

an interferometer for outputting a light beam containing linear and nonlinear signals functionally related to the light pulses; and means for substantially eliminating said linear signal wherein said nonlinear signal provides an interferometric autocorrelation of the beam of light pulses.

2. The autocorrelator according to claim 1, wherein said means for substantially eliminating said linear signal comprises polarizing means in one leg of said interferometer.

3. The autocorrelator according to claim 2, wherein said polarizing means comprises a quarter-wave plate.

4. The autocorrelator according to claim 1, wherein said means for substantially eliminating said linear signal comprises an electronic filter to reject signal frequencies corresponding to said linear signal.

5. The autocorrelator according to claim 4, wherein said autocorrelator additionally comprises means for enhancing said non-linear signals.

6. The autocorrelator according to claim 4, wherein said enhancing means comprises means for generating a 100% fringe depth for unchirped non-linear signals.

7. An autocorrelation method using third-order nonlinearities for determining characteristics of a beam of light pulses, the method comprising the steps of:

outputting via interferometer a light beam containing linear and nonlinear signals functionally related to the light pulses; and substantially eliminating the linear signal wherein the nonlinear signal provides an interferometric autocorrelation of the beam of light pulses.

8. The method according to claim 7, wherein the eliminating step comprises polarizing in one leg of said interferometer.

9. The method according to claim 8, wherein the polarizing step comprises employing a quarter-wave plate.

10. The method according to claim 7, wherein the eliminating step comprises employing an electronic filter to reject signal frequencies corresponding to the linear signal.

11. The method according to claim 10, additionally comprising the step of enhancing the non-linear signals.

12. The method according to claim 10, wherein the enhancing step comprises generating a 100% fringe depth for unchirped non-linear signals.

* * * * *